United States Patent Office 2,812,311
Patented Nov. 5, 1957

2,812,311

WATER DISPERSIBLE SOLID NITRILO-METHYLOL-PHOSPHORUS POLYMERS

Wilson A. Reeves, John D. Guthrie, and Jane Warren, New Orleans, La., assignors to the United States of America as represented by the Secretary of Agriculture No Drawing. Application April 5, 1954,
Serial No. 421,213

9 Claims. (Cl. 260—2)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to nitrilo-methylol-phosphorus polymers. More particularly the invention provides a process of preparing such polymers in a reactive, water-dispersible solid form in which they are stable toward polymerization during storage.

As employed throughout the specification and claims the term "nitrilo-methylol-phosphorus polymer" refers to a cross-linked polymer in which the reoccurring structural units are phosphorus atoms in radicals of the group, trimethylene phosphine oxide, $(-CH_2)_3PO$, and tetramethylene phosphonium chloride, $(-CH_2)_4PCl$, and in which these phosphorus atoms are linked to trivalent nitrogen atoms by connecting structures of the group $-CH_2-$ and $-CH_2OCH_2$. Such polymers are the products of reacting organic nitrogen compounds, which have a molecular weight of not more than about 400 and contain at least one trivalent nitrogen atom and at least two members of the group $-H$ and $-CH_2OH$ attached to trivalent nitrogen atoms, with at least one compound of the group, tetrakis(hydroxymethyl) phosphonium chloride, tris(hydroxymethyl) phosphine oxide and the products of reacting such a phosphorus compound with such a nitrogen compound to produce a product containing at least one $-CH_2OH$ group attached to phosphorus atoms.

As employed throughout the specification and claims, the initials "THPC" refer to tetrakis(hydroxymethyl) phosphonium chloride; the initials "THPO" refer to tris-(hydroxymethyl) phosphine oxide; the term "phosphorus compound" refers to a compound of the group, THPC, THPO and the products of reacting THPC or THPO with a nitrogen compound; and the term "nitrogen compound" refers to an organic nitrogen compound having a molecular weight of not more than about 400 and containing at least one trivalent nitrogen atom and at least two members of the group $-H$ and $-CH_2OH$ attached to trivalent nitrogen atoms.

The co-pending application of Reeves and Guthrie, Serial No. 378,437, filed September 3, 1953, relates to various nitrilo-methylol-phosphorus polymers and describes methods of producing them in the form of further polymerizable liquids or thermosetting solid resins. In accordance with that application the phosphorus compounds are generally reacted with the nitrogen compounds in an aqueous medium and reaction is continued until a viscous aqueous solution of a liquid or solid polymer, or a solid thermosetting resin, is produced. The aqueous solutions of the further polymerizable polymers, even when they are viscous liquids consisting essentially of the polymers, tend to continue polymerization and often become converted to thermosetting resins within a few hours of storage under ordinary conditions.

A primary object of the present invention is to provide a process of producing nitrilo-methylol-phosphorus polymers in a form in which (1) they are water dispersible, (2) they are capable of undergoing further polymerization, or of reacting with additional nitrogen or phosphorus compounds without the addition of catalysts, and (3) they are stable toward the occurrence of further polymerization during storage under ordinary conditions. A further object is to provide plastic powders consisting essentially of reactive water soluble nitrilo-methylol-phosphorus polymers which are stable toward polymerization during storage, and which plastic powders are adapted for use both in the formation of aqueous flame-proofing compositions and for substantially any of the uses heretofore known for thermosetting resins, including those for which it is desirable to employ a powder plastic in the compression, transfer or jet injection molding techniques.

We have discovered that the above and other objects of this invention can be accomplished by causing the reaction between the phosphorus compounds and the nitrogen compounds to proceed in an aqueous medium in a particular manner and to a particular degree of completion, terminating the reaction and isolating the polymers so formed, and dehydrating the isolated polymers without causing appreciable further polymerization.

In general, the control of the manner and extent of the reaction is accomplished by: (1) conducting the reaction with the reactants dissolved in an amount of an aqueous medium selected so that water constitutes from about 40 to 60% of the solution; (2) maintaining the pH of the reaction medium at less than about 5, substantially throughout the reaction; and (3) terminating the reaction before appreciable amounts of undissolved polymers are formed. The reaction is completely terminated by the isolation of the polymers; but the isolation can be preceded by a lowering of the reaction temperature and/or a dilution of the reaction medium, which slows or substantially terminates the reaction, before the polymers are isolated.

In general, the isolation of the polymers is accomplished by lowering the solvent capacity of the reaction medium for nitrilo-methylol-phosphorus polymers and separating the undissolved polymers from the reaction medium. One suitable method of isolating the polymers, comprises, spraying the reaction medium containing the polymers into an evacuated chamber, so that the volatile components of the medium are flash distilled away from the polymers. The polymers produced in solution by the process of this invention are relatively large molecules having a pronounced but limited solubility in the aqueous reaction medium. The solvent capacity of the medium for the polymers can be lowered by a variety of methods. For example, the solvent capacity can be lowered by: diluting the aqueous medium with a relatively large amount of a water miscible organic solvent, such as a lower aliphatic alcohol, in which the polymers are less soluble than they are in water; diluting the aqueous medium with an organic liquid solution of a salt, such as 95% ethanol saturated with sodium chloride; raising the pH of the aqueous medium to above about 5.5 by the addition of a water-soluble basic compound which is inert toward the polymers, such as a tertiary amine or a soluble salt of a weak acid and a strong base such as sodium acetate; materially lowering the temperature of the reaction medium, to a temperature above its freezing point; or the like steps or a combination thereof.

In general the dehydration of the isolated polymers without causing appreciable further polymerization is accomplished by freeing the polymers of substantially all of the entrained uncombined reactants and drying the so treated polymers without the application of substantial amounts of heat. The polymers can be freed of uncombined reactants by mechanical means such as centrifugation and the like and/or by washing with cool water or a water-miscible inert liquid. Preferred processes of drying the polymers comprise evaporating off water under vacuum, and/or washing the polymers with a water-miscible volatile organic liquid such as ethanol, which is inert to the polymers, and evaporating off the volatile liquid remaining in contact with the polymers.

Illustrative examples of suitable nitrogen compounds include: (1) organic amino compounds such as urea and urea derivatives like methylol ureas, alkylated methylol ureas, oxalyl urea and hydantoin; melamine and melamine derivatives like methylol melamines, alkylated methylol melamines, alkyl substituted melamines where the alkyl group or groups are either saturated or unsaturated, and guanidine; (2) aliphatic amines such as ethylamine, ethylenediamine, allylamine and cetylamine; (3) amides such as formamide, butyramide, octadecylamide, dicyandiamide and acrylamide and (4) amino acids such as glycine, lysine and arginine.

The polymers provided by this invention can be formed by reacting the phosphorus compounds with: (1) mixtures of the nitrogen compounds; (2) one or more of the nitrogen compounds and formaldehyde. In the latter case, the phosphorus compounds can suitably be incompletely reacted with the nitrogen compounds prior to reaction with formaldehyde, or the nitrogen compounds can be incompletely reacted with formaldehyde prior to reaction with the phosphorus compounds, or the phosphorus compounds, the nitrogen compounds and formaldehyde can be concurrently reacted.

Melamine, urea, and water-soluble methylolmelamines and methylolureas are preferred members of the nitrogen compounds; and THPC and mixtures of THPC and THPO are preferred members of the phosphorus compounds.

Condensation polymers of THPC and THPO with the nitrogen compounds are preferably prepared by agitating a mixture of the phosphorus and nitrogen compounds in water while heating until polymerization occurs. The preferred relative amounts of phosphorus and nitrogen compounds to be used can be calculated by conventional methods used for condensation polymerization by assuming that: (1) THPC is tetrafunctional and THPO is trifunctional, (2) one methylol group of the phosphorus compound condenses with one hydrogen or methylol group attached to a trivalent nitrogen atom of the nitrogen compound, and (3) THPC is converted to THPO in the presence of neutral carbonates like calcium carbonate, alkali carbonates like sodium carbonate, alkali metal hydroxides, tertiary amines like triethanolamine, and bases in general.

For example, the mole ratio range for polymerizing THPC with melamine is one mole of THPC per 0.2 to 2 moles of the amino compound, with the preferred range being 0.3 to 1.3 moles of the amino compound per mole of THPC. When THPO is polymerized with melamine the mole ratio range is one of THPO per 0.15 to 2 moles of the amino compound, with the preferred range being 0.3 to 1.0 mole of the amino compound per mole of THPO. The THPO can be made in situ as described above. To polymerize THPO with urea the mole ratio range is one mole of THPO per 0.25 to 3.0 moles of urea with the preferred range being 0.6 to 2.0 moles of urea per mole of THPO. To polymerize THPO with acrylamide the mole ratio range is one mole of THPO per 0.5 to 4.0 moles of acrylamide with the preferred mole ratio range being 1.0 to 2.5 moles of acrylamide per mole of THPO.

The solid, water-dispersible, reactive nitrilo-methylol-phosphorus polymers provided by this invention are particularly adapted for employment as flameproofing agents for textile fibers such as cotton, viscose, ramie, jute, vicara, and wool. In this use the polymers can advantageously be shipped and stored under the ordinary conditions for storage and, at the most advantageous time and place, dispersed into an aqueous medium for application to the textiles. Textile modifying agents which can be incorporated into aqueous media containing the polymers of this invention include wetting agents, softeners, mildewproofing agents, water repellents, abrasion resistant materials, and the like. The textile modifying agents can be employed in the proportions in which they are usually employed to accomplish their intended purpose.

The nitrilo-methylol-phosphorus polymers provided by this invention are also adapted for use as polymers to be chemically modified in order to enhance their solubility in surface coating solvents such as turpentine, the lower fatty esters, and the like. These polymers can be so modified by simply heating them in the presence of an alkanol of from about 2 to 7 carbon atoms, e. g., an alkanol such as ethanol, the butanols, the hexanols and the heptanols, and the like. Such a treatment results in the attachment of alkoxy groups to the polymolecules and appreciably increases the solubility of the polymers in the surface coating solvents and in nonpolar organic compounds in general.

The nitrilo-methylol-phosphorus polymers provided by this invention are further adapted for mixing with mold lubricants, plasticizers, and the like, using the compositions and the proportions commonly used with polymers such as the phenol-formaldehyde, urea-formaldehyde and melamine-formaldehyde polymers, to form plastic powders which are adapted for employment in compression, transfer, and jet injection molding processes.

The following examples are illustrative of details of the invention:

*Isolation of soluble low polymers of THPC and melamine.—Example 1*

Three parts of THPC were dissolved in 10 parts water. 1.1 parts melamine was added. Upon heating the mixture almost to boiling, a clear solution formed. 3 parts urea were added, and the solution was boiled for 15 minutes. After cooling for 10–15 minutes, the solution was poured into 400 parts, by volume, of 95% ethanol. The grainy white precipitate which formed was stirred well, filtered off, washed with 95% ethanol, and air dried. It was completely soluble after 24 hours at room temperature in the air, and became only slightly less water soluble after standing in the air for 3–4 weeks.

*Example 2*

110.7 parts of THPC were dissolved in 171 parts water. 13.3 parts melamine were stirred in, and the mixture was stirred vigorously, while being heated to 85–87° C., for 6 minutes. After 1 additional minute at 85–87° C., a clear solution resulted. This solution, called solution A, was heated 5 minutes at 87–93° C., then cooled rapidly to room temperature.

Enough aqueous 20% sodium hydroxide solution was added to a portion of solution A to adjust the pH to 7.4. The precipitate which formed was filtered off and washed with distilled water. This product was insoluble in water, but dissolved in dilute acetic acid.

*Example 3*

10 parts of solution A, from Example 2, were mixed with enough of a 33% solution of sodium acetate to adjust the pH to 5.5. The precipitate which formed was centrifugally separated. The remaining solution was mixed with more sodium acetate solution, and a second crop of precipitate was obtained. The combined precipitates were extremely water soluble, but could be re-precipitated by adding sodium acetate to the solution. After several re-precipitations with sodium acetate solution, the powdery resin was not completely water soluble, but was soluble in dilute acetic acid.

Example 4

5 parts of solution A, from Example 2, were mixed with a solution of sodium acetate in 95% ethanol. The precipitate which formed was filtered off and washed with several portions of the alcoholic sodium acetate solution and with several portions of 95% ethanol. The product was a fine pink powder which was only slightly soluble in water at room temperature, but was soluble in warm dilute acetic acid.

Example 5

A solution of 112.5 parts THPC in 165 parts of water was heated with 22.1 parts melamine with vigorous stirring. The mixture was heated to 90° C. in 8 minutes, at which time a dark pink, clear solution formed. The solution, called solution B, was heated 5 minutes more at 90–93° C. and then cooled rapidly to room temperature.

100 parts of solution B were cooled in an ice bath to 3° C. Precipitate formed until the whole mixture became a gelatinous mass. 15 parts of an aqueous 2% triethanolamine solution were added, then undiluted triethanolamine was added to bring the mixture to pH 5.5–6.0. The mixture was filtered with suction, using 80 x 80 cotton print cloth instead of filter paper. The precipitate was very hygroscopic. It was washed with several small portions of ethanol, and then powdered into fine particles, in a larger volume of ethanol. The ethanol was removed, and the precipitate was dried in a vacuum desiccator. This product was not hygroscopic. A second batch of powdery resin was obtained from the original aqueous filtrate by the same method used in obtaining the first crop.

Both batches of resin were completely water soluble. After storage for 8 weeks in a refrigerator, the first batch was still completely water soluble; the second batch was partially soluble in water and completely soluble in dilute acetic acid.

Example 6

100 parts of solution B, from Example 5, were cooled in an ice bath to 0–5° C. until a gelatinous mass formed. Triethanolamine was added until the pH of the mixture was 5.5–6.0. The material was kept at 0–5° C. for 4 hours in order to coagulate the precipitate, then was filtered with suction through 80 x 80 print cloth. A second batch was obtained by cooling the filtrate again, and adding more triethanolamine. Both batches of precipitate were washed with 95% ethanol, then were dried in a vacuum desiccator. The products were partially soluble in cold water, completely soluble in hot water. After storage for 8 weeks in a refrigerator, the resins were partially soluble in cold or hot water, some particles dissolving, others merely swelling. The stored resins were soluble in warm dilute acetic acid.

Example 7

213.6 parts of THPC in 342 parts water were mixed with 44.4 parts melamine and heated, with stirring, to 85° C. The clear solution which formed was heated 5 minutes at 87–96° C., and then cooled rapidly to room temperature.

380 parts of this solution were stored in a refrigerator overnight. A layer of pink residue precipitated, leaving a clear pink liquid. The liquid was decanted off, and the precipitate was mixed with 400 parts by volume of 95% ethanol. When the ethanol was filtered off, the precipitate was slightly hygroscopic. It was stirred well in a fresh portion of EtOH (300 parts by volume), filtered, and dried in a vacuum desiccator. It was no longer hygroscopic but it was completely water soluble. Analysis of this product gave 28.67% nitrogen, 10.89% phosphorus.

The original aqueous layer was cooled in an ice bath. Triethanolamine was added to adjust the pH to 5.5–6.0. After 2½ hours, the precipitate which had formed was filtered off, washed twice with 95% ethanol, and dried in a vacuum desiccator. The resin was completely soluble in water at room temperature. Analysis showed 27.60% nitrogen, 12.26% phosphorus.

*Isolation of water insoluble, water dispersible low polymers of THPC and melamine.—Example 8*

A solution of 178.2 parts THPC in 285 parts water was stirred vigorously and heated with 36.8 parts melamine to 87° C. in 8 minutes. The clear solution which formed was heated 5 minutes at 90–96° C., then cooled rapidly to room temperature. On standing overnight, the solution developed a faint turbidity. At this stage, it was stirred vigorously while triethanolamine was added in small amounts until the pH of the mixture was 4.10. The precipitate which formed was very finely divided and remained suspended for 2 hours. After this interval, more triethanolamine was added to raise the pH to 5.14. The precipitate was separated from the liquid by centrifuging, and was washed thoroughly with water, in which it dispersed readily. It was dried in a vacuum desiccator. The powdery product was insoluble in hot water, hot dilute $CH_3COOH$, hot glacial $CH_3COOH$. On standing, the dry powder formed hard clumps. Analysis of the product was 27.65% nitrogen, 11.11% phosphorus.

*Further reaction of soluble THPC-melamine resin with THPC.—Example 9*

7.7 parts of a soluble THPC-melamine resin, prepared as described in Example 7, were dissolved in a solution of 11.6 parts THPC in 29.6 parts water. The solution was heated to 80° C. in 4 minutes, and maintained at 80° C. for 5 minutes. On rapid cooling to room temperature, the clear solution developed a faint turbidity. On cooling in an ice bath, the whole solution set up to a flowing gelatinous mass. The precipitate was filtered off and washed with 300 parts by volume of 95% ethanol. The product was hygroscopic until treated with several small portions of ethanol and dried in a vacuum desiccator. The dry powder, which gave a cloudy solution in water at room temperature after 1 week in desiccator was completely soluble in hot water. It contained 27.87% nitrogen, 9.87% phosphorus, 12.99% chlorine.

*Further reaction of water-dispersible THPC-melamine resins with THPC.—Example 10*

An insoluble powdery resin was prepared exactly as described in Example 8, except that after centrifuging to remove from the liquid portion, the precipitate was not washed, but was dispersed in a 30% solution of THPC and heated for 40 minutes at 85° C. No solution formed. The powder was filtered off, heated again for 20 minutes at 90° C. with a fresh solution of THPC (30%), filtered from this mixture and heated 6 hours at 60–75° C. with a third solution of THPC (30%). No solution formed; but the grain of the powder became finer with each period of heating. The product was filtered and washed thoroughly with water. It did not clump in water or on standing after drying in a desiccator. It was insoluble in water, HCl, $CH_3COOH$, and urea-phosphoric acid solution. Analysis showed it to contain 25.94% nitrogen, 12.48% phosphorus, 9.35% chlorine.

*Use of soluble THPC-melamine resin in a composition for flameproofing cotton fabric.—Example 11*

25 parts of the resin prepared in Example 7 were dissolved in 30 parts water (at 45° C.) containing 6.6 parts urea. 4.0 parts water (at 45° C.) and 4.6 parts of a 25% aqueous solution of triethanolamine were added.

Two 6" x 39" strips of 80 x 80 cotton print cloth were padded with the above solution on a laboratory padder to a wet pickup of 100–111%. The fabric was immediately dried for 4 minutes at 85° C. in a blower oven. One strip was then cured at 140° C. for 4 minutes while the second strip was submerged for 40 seconds in concentrated NH₄OH and air dried. Both strips were washed thoroughly in hot water, then air dried.

The heat cured fabric had a weight increase of 40.0% and contained 9.12% nitrogen, 2.85% phosphorus. The NH₄OH treated strip had a weight increase of 35.6% and contained 8.72% nitrogen, 3.25% phosphorus. Both fabrics were flameproof, i. e., they passed Federal Specification CCC-T-191b.

A second solution of the resin prepared in Example 7 was made up so that it contained 25% resin, 6.6% urea, and 1.2% triethanolamine. Two strips of 80 x 80 cotton print cloth were padded with this solution to wet pickup values of 79% and 91%. After drying at 85° C. for 4 minutes, one strip was cured at 140° C. for 4 minutes while the other was submerged for 40 seconds in concentrated NH₄OH and air dried. Both strips were washed thoroughly in hot water, and air dried. Weight increase of the heat cured fabric was 20.8%, and it contained 5.59% nitrogen, 1.68% phosphorus. The NH₄OH-treated fabric had a weight increase of 21.3% and contained 5.72% nitrogen, 2.18% phosphorus. Both fabrics were flame resistant, but they did not pass Federal Specification CCC-T-191b.

*Formation of hard, brittle polymers.—Example 12*

The resin solutions used to treat the fabrics in Example 11 were allowed to stand at room temperature in air for 1 week. In that time, the solution containing 35.5% resin had hardened to a brittle, cloudy pink polymer. The solution containing 25% resin had hardened to a brittle, perfectly clear, pink polymer. Thin clear films formed on the sides of the vessels containing these solutions.

*Example 13*

A concentrated aqueous solution of the polymer prepared in Example 5 was heated at 90–96° C. in a water bath for 6–10 minutes. A perfectly clear, hard polymer formed.

*Isolation of soluble low polymers of THPC and urea.— Example 14*

A solution was made up to contain 30.4 parts THPC, 9.6 parts urea, 4.9 parts triethanolamine and 55.1 parts water. This solution was heated in a water bath at 90° C. for 20 minutes, then was allowed to cool to room temperature. The polymer solution showed no thickening or precipitation, and gave no precipitation on being poured into ethanol.

The solution was extracted with 1,4-dioxane in a separatory funnel. The polymer was at first a clear oily layer, and on succeeding extractions became thick and cloudy. The thick oil was separated from the dioxane and was washed with several portions of diethyl ether. After the ether had evaporated off, the product was a grainy gum which was completely water soluble, and remained so on storage at room temperature.

A water solution of the grainy gum polymerized to a clear, stiff, insoluble gel on being heated in a water bath at 90° C. for ½ hour.

*Isolation of soluble low polymer of THPC and dicyandiamide.—Example 15*

A solution of 32.8 parts THPC in 60.0 parts water was heated with 7.2 parts dicyandiamide at 88–94° C. for 45 minutes. The resulting clear yellow solution was cooled to room temperature. There was no precipitation, and no apparent increase in viscosity.

When this solution was shaken with 1,4-dioxane, an oily layer of polymer separated out. This layer was shaken with several portions of dioxane, then with several portions of diethyl ether. The ether was evaporated off. The product, a clear yellow oil, was converted into a stiff tacky gum on being heated at about 100° C. This gum was water soluble.

*Isolation of soluble low polymers of THPO and melamine.—Example 16*

A mixture of 1.3 parts of melamine, 31 parts THPO, and 2.8 parts of water was heated on a hot plate until most of the melamine dissolved. The material was cooled to room temperature and diluted with about 3 parts water. The few particles of undissolved melamine were filtered off, and the clear filtrate was poured into 33 parts (by volume) of 95% ethanol. The precipitate which formed was filtered off and washed with several portions of ethanol. This powdery product was water soluble, and in water solution was polymerized to a stiff gel by several minutes of boiling.

*Isolation of soluble polymer of melamine with a mixture of THPC and THPO.—Example 17*

A mixture of 19.3 parts of THPC, 14.2 parts THPO, 18 parts of approximately 1 N HCl, and 6.5 parts melamine was stirred vigorously and heated to 88° C. in 11 minutes. The clear solution which formed at this point was heated 3 minutes at 88–90° C., then cooled to room temperature. It was poured into 95% ethanol; and the grainy precipitate which formed was filtered off, washed with several portions of ethanol, and dried in a vacuum desiccator. This grainy powder was completely water soluble, and remained so during 4 days of storage at room temperature.

We claim:

1. A process for producing a further polymerizable, water-dispersible, solid polymer which is stable during storage, which process comprises preparing an aqueous solution in which the water comprises from 40 to 60% of the solution and which contains at least one nitrogen compound having a molecular weight of not more than about 400 and containing at least two members of the group consisting of hydrogen atoms and methylol (—CHOH) radicals attached to trivalent nitrogen atoms, said aqueous solution also containing at least one phosphorus compound selected from the group consisting of tetrakis (hydroxymethyl) phosphonium chloride, tris(hydroxymethyl) phosphine oxide, and a product obtained by partially reacting said nitrogen compounds with said phosphorus compounds, which partial reaction product contains at least two methylol (—CH₂OH) groups attached to a phosphorus atom, heating said solution to a temperature of from about 85° C. to about the boiling point of the solution while maintaining the pH below about 5, continuing the heating until just before insolubilization of the reaction product occurs, isolating the still water soluble polymeric reaction product by lowering the solvent capacity of the reaction medium, and finally dehydrating the isolated polymer at a temperature below about 45° C.

2. The process of claim 1 in which the nitrogen compound is melamine and the phosphorus compound is tetrakis(hydroxymethyl) phosphonium chloride.

3. The process of claim 1 in which the nitrogen compound is dicyandiamide and the phosphorus compound is tetrakis(hydroxymethyl)phosphonium chloride.

4. The process of claim 1 in which the nitrogen compound is urea and the phosphorus compound is tetrakis(hydroxymethyl)phosphonium chloride.

5. The process of claim 1 in which the nitrogen compound is a reaction product of tetrakis(hydroxymethyl)-phosphonium chloride with melamine containing at least one CH₂OH group, and the phosphorus compound is tetrakis(hydroxymethyl)phosphonium chloride.

6. The process of claim 1 in which the nitrogen compound is melamine and the phosphorus compound is tris-(hydroxymethyl)phosphine oxide.

7. The process of claim 1 in which the nitrogen compound is melamine and the phosphorus compound is a mixture of tetrakis(hydroxymethyl)phosphonium chloride and tris(hydroxymethyl)phosphine oxide.

8. A process of flame-proofing organic textiles which comprises forming an aqueous dispersion of the solid polymer produced according to the process of claim 1, impregnating an organic textile material with the aqueous dispersion of the polymer and heating to further polymerize the entrained polymer to convert it to an insoluble thermosetting resin.

9. A further polymerizable, water-dispersible solid, stable polymer produced according to the process of claim 1.

References Cited in the file of this patent

UNITED STATES PATENTS 2,668,096    Reeves et al. _____ Feb. 2, 1954

OTHER REFERENCES

Lange's Handbook of Chemistry, 8th edition, pp. 458 and 459.